(12) United States Patent
Lin

(10) Patent No.: US 10,858,064 B2
(45) Date of Patent: Dec. 8, 2020

(54) MECHANICAL DISC BRAKE STRUCTURE

(71) Applicant: Chang Hui Lin, Changhu (TW)

(72) Inventor: Chang Hui Lin, Changhu (TW)

(*) Notice: Subject to any disclaimer, the term of this patent is extended or adjusted under 35 U.S.C. 154(b) by 0 days.

(21) Appl. No.: 16/112,717

(22) Filed: Aug. 26, 2018

(65) Prior Publication Data
US 2020/0062334 A1 Feb. 27, 2020

(51) Int. Cl.
*F16D 65/18* (2006.01)
*B62L 1/00* (2006.01)
*F16D 55/228* (2006.01)
*F16D 121/14* (2012.01)
*F16D 129/04* (2012.01)
*F16D 125/28* (2012.01)
*F16D 127/02* (2012.01)
*F16D 125/60* (2012.01)

(52) U.S. Cl.
CPC ............ B62L 1/005 (2013.01); *F16D 55/228* (2013.01); *F16D 2121/14* (2013.01); *F16D 2125/28* (2013.01); *F16D 2125/60* (2013.01); *F16D 2127/02* (2013.01); *F16D 2129/04* (2013.01)

(58) Field of Classification Search
CPC .... B62L 1/005; F16D 55/228; F16D 2121/14; F16D 2125/28; F16D 2125/60; F16D 2125/36; F16D 2127/02; F16D 2129/04
See application file for complete search history.

(56) References Cited

U.S. PATENT DOCUMENTS

| | | | | |
|---|---|---|---|---|
| 6,230,850 B1* | 5/2001 | Huang | ................... | B62L 1/00 188/24.12 |
| 6,250,438 B1* | 6/2001 | Chern | ................... | B62L 1/00 188/72.3 |
| 6,520,297 B1* | 2/2003 | Lumpkin | ............. | B60T 11/046 188/24.15 |
| 6,883,648 B2* | 4/2005 | Feng | ................... | B60T 11/046 188/2 D |
| RE42,635 E * | 8/2011 | Kirimoto | ............ | B60T 11/046 188/26 |
| 9,168,974 B2* | 10/2015 | Harris | ................... | B62L 1/005 |
| 9,394,029 B2* | 7/2016 | Tsai | ................... | B62L 1/005 |
| 9,771,125 B1* | 9/2017 | Kuo | ..................... | B62L 3/02 |
| 9,869,356 B2* | 1/2018 | Zhou | ................ | F16D 55/2265 |
| 10,119,584 B2* | 11/2018 | Lin | ..................... | F16D 55/2265 |
| 2005/0161291 A1* | 7/2005 | Chen | ................... | B62L 1/00 188/2 D |
| 2018/0297662 A1* | 10/2018 | Wen | ................. | F16D 55/2245 |
| 2019/0085919 A1* | 3/2019 | Yang | ................... | F16D 65/183 |

* cited by examiner

*Primary Examiner* — Xuan Lan Nguyen

(57) ABSTRACT

A mechanical disc brake structure contains: a base, two disc brake units, and a connection block. The base includes at least one elongated fixer, a first receiving space, two first connecting portions, two second receiving spaces, two limiting grooves two connection racks, two through orifices. Each disc brake unit includes a rotation portion, multiple first balls, a first circular disk, a second circular disk, an affix element, and a first cap. The connection block includes a first aperture configured to correspond to the second hole of the rotation portion of each disc brake unit so that each of two locking elements is connected with the second hole and the passing aperture; the connection block further includes a second aperture formed on a predetermined position thereof so that the steel cable is inserted into the connector from the second aperture of the connection block.

7 Claims, 8 Drawing Sheets

MECHANICAL DISC BRAKE STRUCTURE

FIELD OF THE INVENTION

The present invention relates to a mechanical disc brake structure which is capable of clamping or unclamping a disc brake efficiently.

BACKGROUND OF THE INVENTION

A conventional disc brake is a type of brake that uses calipers to squeeze pairs of pads against a disc to create friction. This action retards the rotation of a shaft, such as a vehicle axle, either to reduce its rotational speed or to hold it stationary.

However, the conventional disc brake cannot contain a fitting sleeve configured to cause variable speed transmission, so a rear wheel of the bicycle cannot change rotation speed.

The present invention has arisen to mitigate and/or obviate the afore-described disadvantages.

SUMMARY OF THE INVENTION

The primary objective of the present invention is to provide a mechanical disc brake structure in which the rotation portion of each disc brake unit rotates along the first circular disk, the second circular disk, and the affix element so that the rotation portion rotates after the rotary handle is pulled by the steel cable in the connection block, each first ball rolls in each depth segment and each narrow segment of the first circular disk so as to push the first circular disk and the affix element to drive the brake pad, and the brake pad is driven to clamp or unclamp a disc brake.

DETAILED DESCRIPTION OF THE PREFERRED EMBODIMENTS

Figure 1:
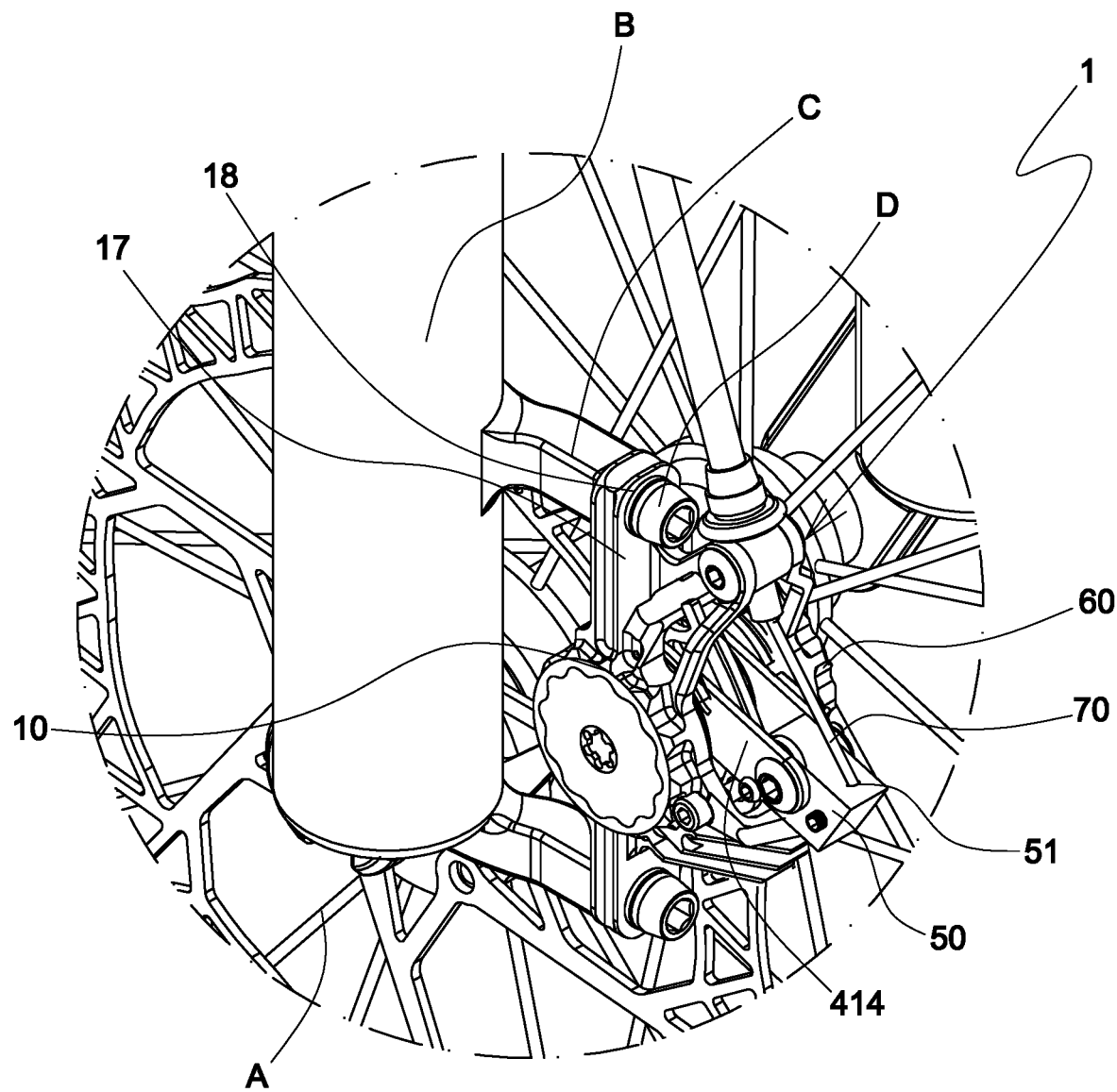
FIG. 1 is a perspective view showing the application of a mechanical disc brake structure according to a preferred embodiment of the present invention.
Figure 2:
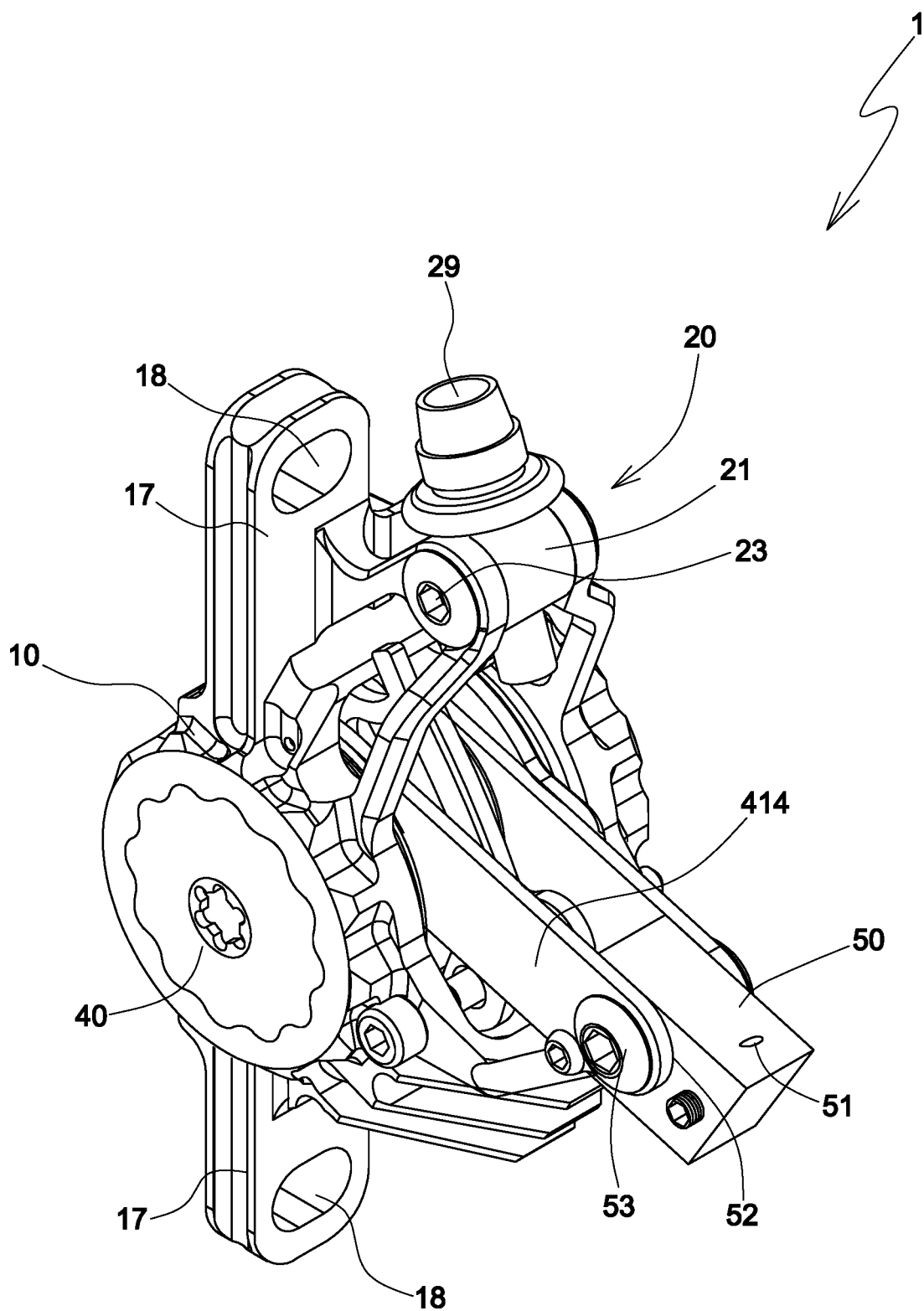
FIG. 2 is a perspective view showing the assembly of the mechanical disc brake structure according to the preferred embodiment of the present invention.
Figure 3:
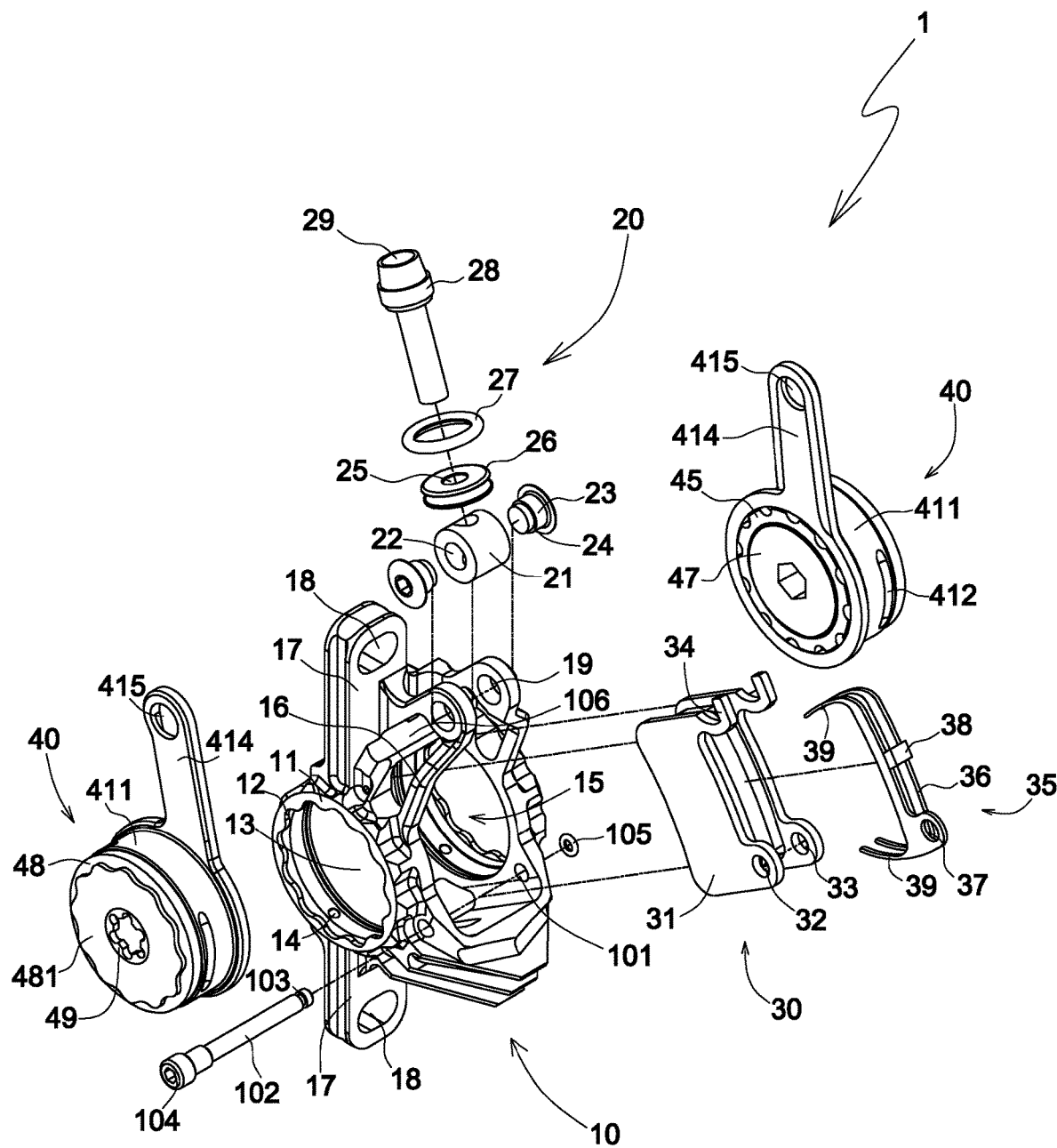
FIG. 3 is a perspective view showing the exploded components of the mechanical disc brake structure according to the preferred embodiment of the present invention.
Figure 4:
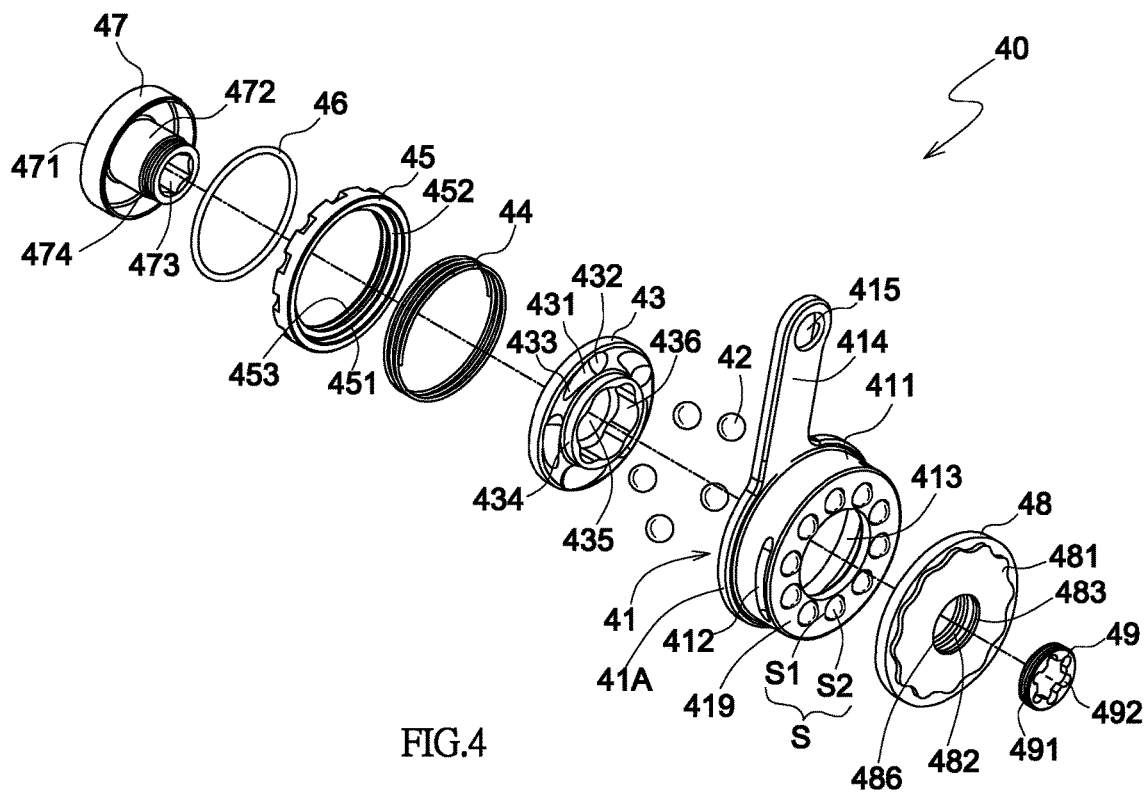
FIG. 4 is a perspective view showing the exploded components of a part of the mechanical disc brake structure according to the preferred embodiment of the present invention.
Figure 5:
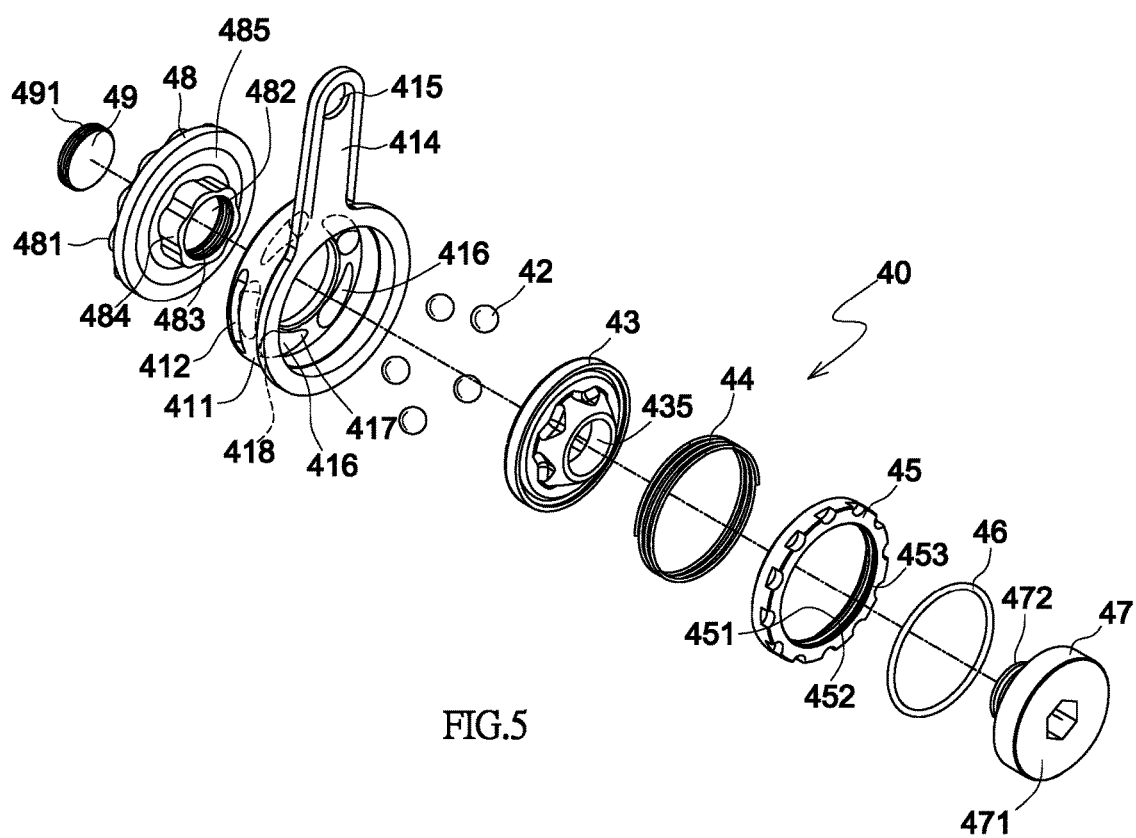
FIG. 5 is another perspective view showing the exploded components of a part of the mechanical disc brake structure according to the preferred embodiment of the present invention.
Figure 6:
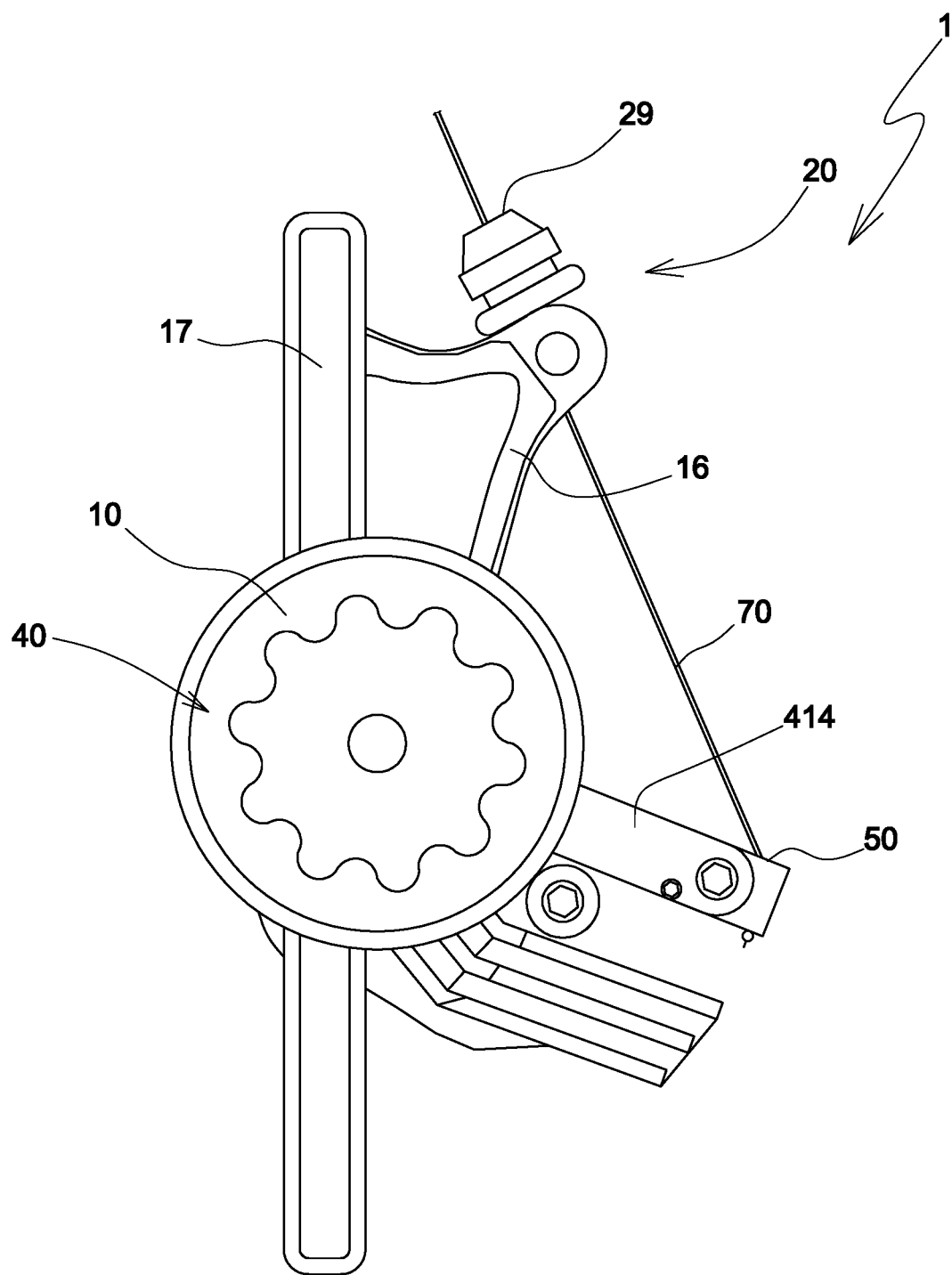
FIG. 6 is a side plan view showing the operation of the mechanical disc brake structure according to the preferred embodiment of the present invention.
Figure 7:
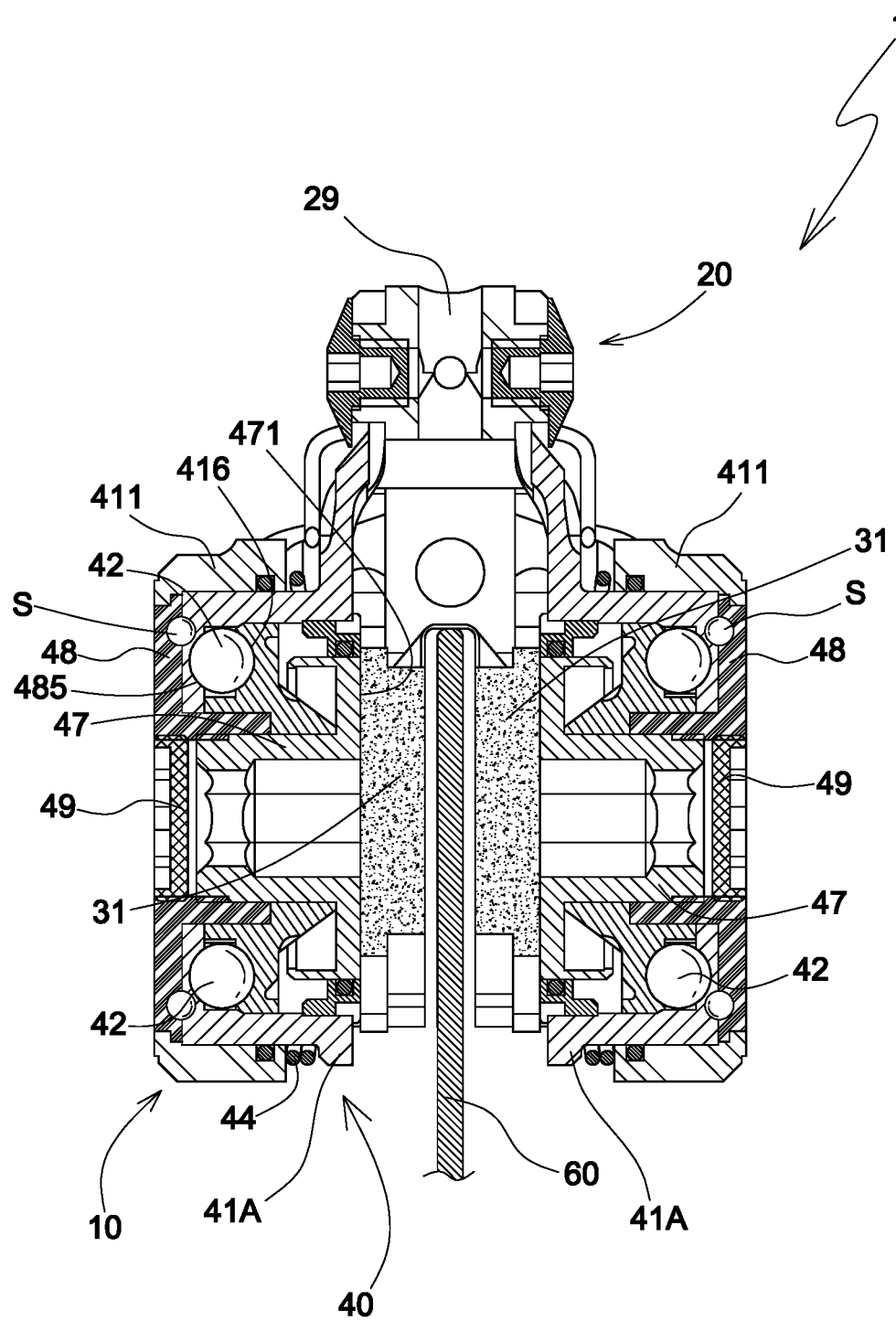
FIG. 7 is a cross sectional view showing the operation of the mechanical disc brake structure according to the preferred embodiment of the present invention.
Figure 8:
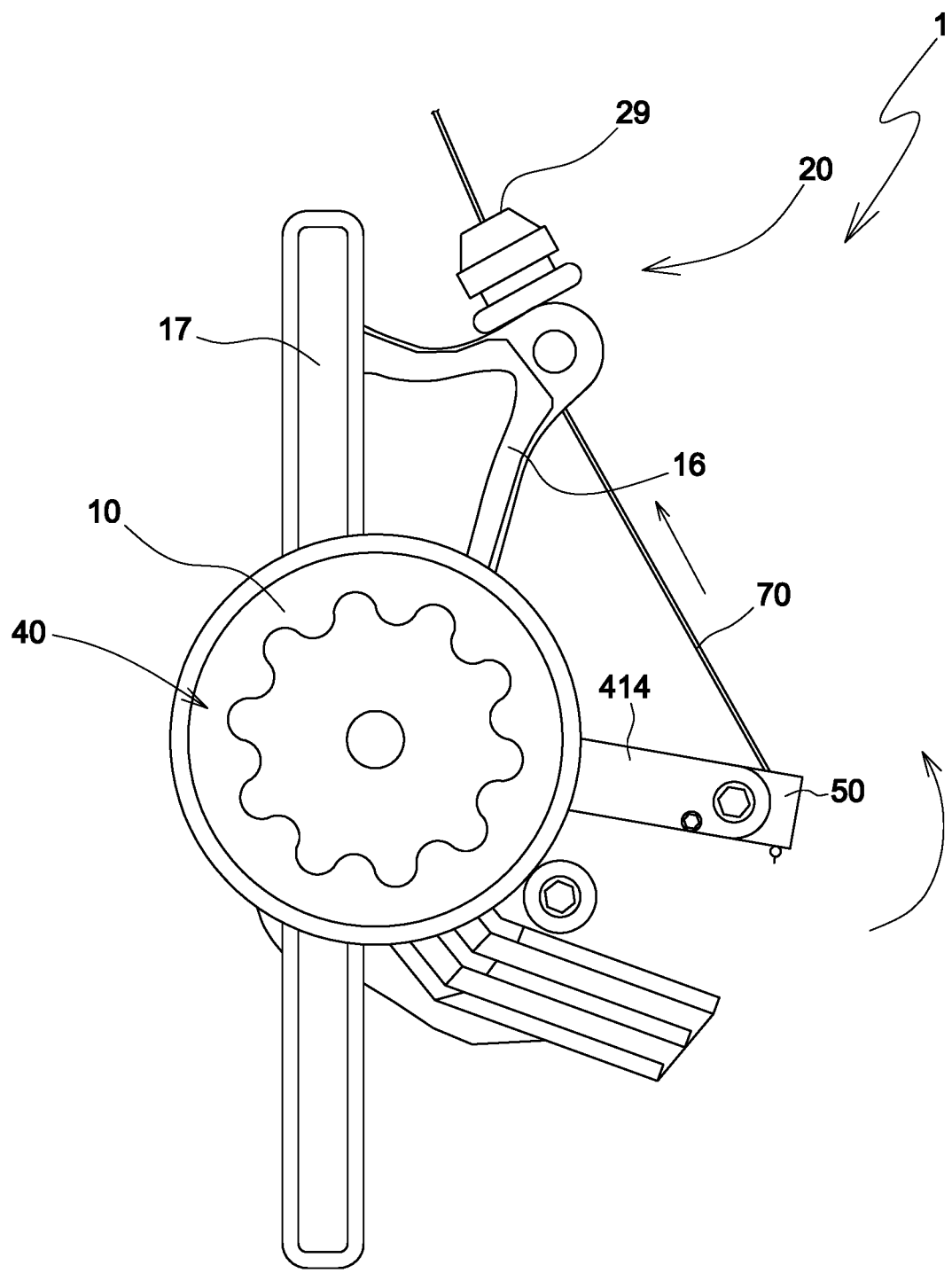
FIG. 8 is another side plan view showing the operation of the mechanical disc brake structure according to the preferred embodiment of the present invention.
Figure 9:
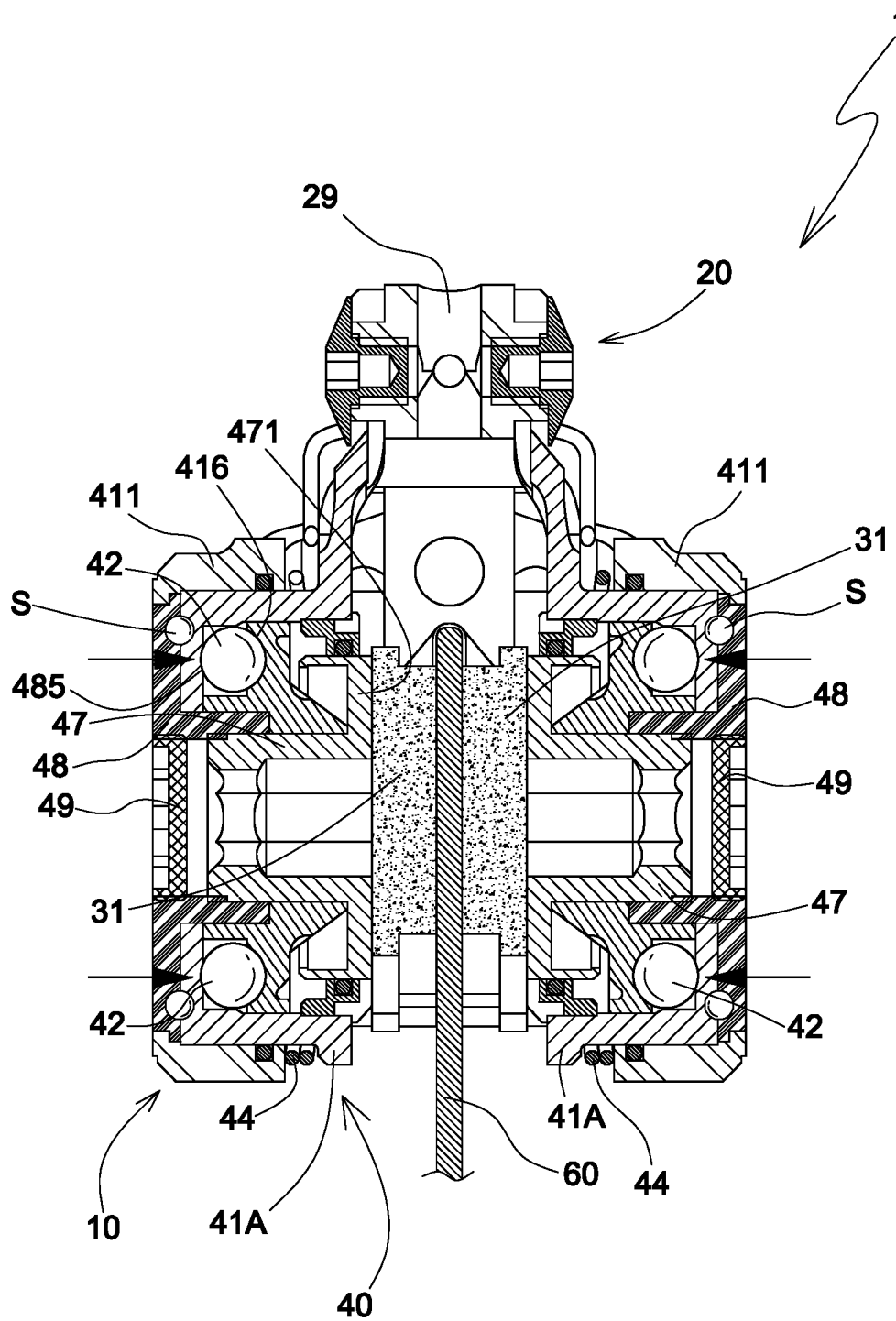
FIG. 9 is another cross sectional view showing the operation of the mechanical disc brake structure according to the preferred embodiment of the present invention.

With reference to FIGS. 1-9, a mechanical disc brake structure 1 according to a preferred embodiment of the present invention comprises: a base 10, an accommodation member 20, two disc brake units 40, a connection block 50, and a steel cable 70.

The base 10 includes at least one elongated fixer 17 mounted on a side thereof, at least one first fixing orifice 18 defined on each of the at least one elongated fixer 17 and screwed with a screw bolt D so as to connect the at least one elongated fixer 17 with an extension C of a fork B of spokes A, a first receiving space 15 defined in the base 10, two first connecting portions 11 formed on two side surfaces of the base 10 respectively, two second receiving spaces 13 passing through the two first connecting portions 11 respectively and communicating with the first receiving space 15, 13, two limiting grooves 12 defined in the two second receiving spaces 13 individually, two connection racks 16 arranged on an upper end of the base 10 above the two first connecting portions 11 respectively, two through orifices 19 defined on two tops of the two connection racks 16 individually so as to connect with a connector 20 which has a guide orifice 29 defined on a predetermined position of the connector 20. The base 10 further includes two second fixing orifices 101 formed on a lower end thereof beside the two first connecting portions 11 individually and communicating with the first receiving space 15 so as to accommodate a shaft 102 which is rotatably connected with a brake pad 30 having two braking parts 31.

The two disc brake units 40 are mounted in the two second receiving spaces 13 of the base 10 respectively, and each of the two disc brake units 40 includes a rotation portion 41, multiple first balls 42, a first circular disk 43, a second circular disk 48, an affix element 47, and a first cap 45.

The rotation portion 41 has a circular protrusion 411 extending from a first side surface thereof and rotatably accommodated in each of the two second receiving spaces 13, an external face 419 formed on an outer surface of the circular protrusion 411 and having a bearing set S received in the external face 419, a first hole 413 passing through a center of the external face 419, and multiple accommodating recesses 416 surrounding an inner wall of the external face 419, wherein each of the multiple accommodating recesses 416 has a first guiding segment 418 defined on an end thereof corresponding to each of multiple depth segments 432, and each accommodating recess 416 has a second guiding segment 417 defined on the other end thereof corresponding to each of multiple narrow segments 433. The rotation portion 41 has a rotary handle 414 extending outward from a second side surface thereof, and the rotary handle 414 has a second hole 415 formed on a distal end thereof.

A part of each of the multiple first balls 42 is accommodated in each accommodating recess 416 of the rotation portion 41.

The first circular disk 43 has a fitting rib 434 extending from a center thereof and inserting through the first hole 413 of the rotation portion 41, a noncircular groove 436 defined in a first end of the first circular disk 43, a third hole 435 formed in a second end of the first circular disk 43, wherein a diameter of the third hole 435 is less than the noncircular groove 436. The first circular disk 43 further has multiple arcuate notches 431 equidistantly spaced and surrounding the fitting rib 434, wherein each of the multiple arcuate notches 431 has each depth segment 432 and each narrow segment 433 so that the other part of each first ball 42 is housed in each arcuate notch 431.

The second circular disk 48 includes a noncircular column 484 extending from a first side surface thereof and rotated in the noncircular groove 436 of the first circular disk 43, a defining portion 481 extending from a second side surface of the second circular disk 48 and accommodated in each of the two limiting grooves 12 of the base 10, a surrounding trench 485 defined in the first surface of the second circular disk 48 outside the noncircular column 484 and corresponding to the bearing set S of the rotation portion 41, a fourth hole 486 defined on a center of the second circular disk 48, a first threaded section 482 and a second threaded section 483 which are formed on two ends of the fourth hole 486 respectively, wherein the second threaded section 483 is configured to screw with multiple threads 491 of a second cap 49.

The affix element 47 has a coupling column 472 extending from a first end thereof facing the first circular disk 43, and the coupling column 472 has a third threaded section 474 and is inserted through the third hole 435 of the first circular disk 43 to screw with the first threaded section 482 by using the third threaded section 474, such that the affix element 47 connects the first circular disk 43, the rotation portion 41, and the second circular disk 48. The affix element 47 further has a locking cavity 473 defined in the coupling column 472 thereof and has a forcing segment 471 formed on a second end of the affix element 47 configured to connect with the external face 419 facing the brake pad 30.

The first cap 45 is hollow and has a first peripheral fence 451 defined around a side of an inner wall thereof and a second peripheral fence 453 formed on the other side of the inner wall of the first cap 45 opposite to the first peripheral fence 451, a defining fence 452 defined between the first peripheral fence 451 and the second peripheral fence 453, a first washer 46 accommodated inside the second peripheral fence 453 so that the first cap 45 is fitted onto the affix element 47 relative to the first washer 46, and a resilient element 44 is received inside the first peripheral fence 451, hence the first cap 45 forces the resilient element 44 to abut against the rotation portion 41.

The connection block 50 includes a first aperture 52 configured to correspond to the second hole 415 of the rotation portion 41 of each disc brake unit 40 so that each of two locking elements 53 is connected with the second hole 415 and the passing aperture 52. The connection block 50 further includes a second aperture 51 formed on a predetermined position thereof so that the steel cable 70 is inserted into the connector 20 from the second aperture 51 of the connection block 50.

Thereby, the rotation portion 41 of each disc brake unit 40 rotates along the first circular disk 43, the second circular disk 48, and the affix element 47 so that the rotation portion 41 rotates after the rotary handle 414 is pulled by the steel cable 70 in the connection block 50, each first ball 42 rolls in each depth segment 432 and each narrow segment 433 of the first circular disk 43 so as to push the first circular disk 43 and the affix element 47 to drive the brake pad 30, and the brake pad 30 is driven to clamp or unclamp a disc brake 60.

The base 10 further include at least one second ball 14 received in at least one predetermined position of each second receiving space 13 of the base 10, and the rotation portion 41 of each disc brake unit 40 has a first slot 412 in which the at least one second ball 14 is limited rolled so that the rotation portion 41 is limitedly rotated to a predetermined angle relative to the first circular disk 43, the second circular disk 48, and the affix element 47. The shaft 102 is rotatably accommodated in the two second fixing orifices 101 of the base 10 and has a connection segment 104 arranged on a first end of the shaft 102, the shaft 102 further has a second slot 103 defined on a second end thereof so as to retain with a first ring 105.

The connector 20 includes a body 21, and the body 21 has a first opening 22 axially defined therein and corresponding to the two through orifices 19 of the base 10, two joining elements 23, and two contact portions 24 formed on the two joining elements 23 respectively, such that the two joining elements 23 are connected with the two through orifices 19 and the first opening 22 by using the two contact portions 24 respectively. Furthermore, a fitting post 28 is radially inserted through a second opening of the body 21 intersecting and communicating with the first opening 22, wherein the fitting post 28 has a third opening 29 configured to accommodate the steel cable 70, a second ring 25 is defined between the fitting post 28 and the body 21 and has a trough 26 formed around a peripheral wall of the second ring 25 so as to accommodate a second washer 27.

The base 10 includes a stop section 106 connected among the two tops of the two connection racks 16 and the two connecting portions 11, and the two braking parts 31 of the brake pad 30 have two hooks 34 respectively corresponding to the stop section 106. One of the two braking parts 31 has a third fixing orifice 32, and the other braking part 31 has a fourth fixing orifice 33, such that the third fixing orifice 32 and the fourth fixing orifice 33 are rotatably connected with the shaft 102 of the base 10, the two hooks 34 of the two braking parts 31 retain with the stop section 106 of the base 10. A flexible member 35 is defined between the two braking parts 31 and has two extending sheets 36 between which a second connecting portion is formed, each extending sheet 36 has four clamp portions 39 vertically extending from two ends thereof respectively, such that the two clamp portions 39 of each extending sheet 36 are guided into the two braking parts 31 individually. The flexible member 35 further has a projection 38 arranged on two central positions of the two extending sheets 36 and located between the two braking parts 31 so that the two braking parts 31 flexibly clamp or unclamp the disc brake 60.

The second cap 49 has a noncircular driving trench 492 defined in an end thereof so that the second cap 49 is locked or unlocked by rotating the noncircular driving trench 492 by using a hand tool.

The bearing set S of the rotation portion 41 has multiple indentions S1 and multiple third balls S2 accommodated in the indentions S1 individually.

The rotation portion 41 has a pushing rib 41A formed around a peripheral wall thereof so as to abut against the resilient element 44.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A mechanical disc brake structure comprising:
a base including at least one elongated fixer mounted on a side of the base, a first receiving space defined in the base, two first connecting portions formed on two side surfaces of the base respectively, two second receiving spaces communicating with the first receiving space, two limiting grooves defined in the two second receiving spaces individually, two connection racks arranged on an upper end of the base respectively, two through orifices defined on two tops of the two connection racks individually so as to connect with a connector which has a guide orifice defined on a predetermined position of the connector, two second fixing orifices formed on a lower end of the base and configured to accommodate a shaft which is rotatably connected with a brake pad having two braking parts;

two disc brake units mounted in the two second receiving spaces of the base respectively, and each of the two disc brake units including a rotation portion, multiple first balls, a first circular disk, a second circular disk, an affix element, and a first cap;

wherein the rotation portion has a circular protrusion extending from a first side surface thereof, an external face formed on an outer surface of the circular protrusion and having a bearing set received in the external face, a first hole passing through a center of the external face, and multiple accommodating recesses surrounding an inner wall of the external face, wherein each of the multiple accommodating recesses has a first guiding segment defined on an end thereof corresponding to each of multiple depth segments, and each accommodating recess has a second guiding segment defined on the other end thereof corresponding to each of multiple narrow segments, the rotation portion has a rotary handle extending outward from a second side surface thereof, and the rotary handle has a second hole formed on a distal end thereof;

wherein a part of each of the multiple first balls is accommodated in each accommodating recess of the rotation portion;

wherein the first circular disk has a fitting rib extending from a center thereof and inserting through the first hole of the rotation portion, a noncircular groove defined in a first end of the first circular disk, a third hole formed in a second end of the first circular disk, wherein a diameter of the third hole is less than the noncircular groove, the first circular disk further has multiple arcuate notches equidistantly spaced and surrounding the fitting rib, wherein each of the multiple arcuate notches has each depth segment and each narrow segment so that the other part of each first ball is housed in each arcuate notch;

wherein the second circular disk includes a noncircular column extending from a first side surface thereof and rotated in the noncircular groove of the first circular disk, a defining portion extending from a second side surface of the second circular disk and accommodated in each of the two limiting grooves of the base, a surrounding trench defined in the first surface of the second circular disk outside the noncircular column and corresponding to the bearing set of the rotation portion, a fourth hole defined on a center of the second circular disk, a first threaded section and a second threaded section which are formed on two ends of the fourth hole respectively, wherein the second threaded section is configured to screw with multiple threads of a second cap;

wherein the affix element has a coupling column extending from a first end thereof facing the first circular disk, and the coupling column has a third threaded section and is inserted through the third hole of the first circular disk to screw with the first threaded section by using the third threaded section, such that the affix element connects the first circular disk, the rotation portion, and the second circular disk; the affix element further has a locking cavity defined in the coupling column thereof and has a forcing segment formed on a second end of the affix element configured to connect with the external face facing the brake pad; and wherein the first cap is hollow and has a first peripheral fence defined around a side of an inner wall thereof and a second peripheral fence formed on the other side of the inner wall of the first cap opposite to the first peripheral fence, a defining fence defined between the first peripheral fence and the second peripheral fence, a first washer accommodated inside the second peripheral fence so that the first cap is fitted onto the affix element relative to the first washer, and a resilient element is received inside the first peripheral fence, hence the first cap forces the resilient element to abut against the rotation portion;

wherein a connection block includes a first aperture configured to correspond to the second hole of the rotation portion of each disc brake unit so that each of two locking elements is connected with the second hole and the passing aperture; the connection block further includes a second aperture formed on a predetermined position thereof so that the steel cable is inserted into the connector from the second aperture of the connection block.

2. The mechanical disc brake structure as claimed in claim 1, wherein the base further include at least one second ball received in at least one predetermined position of each second receiving space of the base, and the rotation portion of each disc brake unit has a first slot in which the at least one second ball is limited rolled; the shaft is rotatably accommodated in the two second fixing orifices of the base and has a connection segment arranged on a first end of the shaft, the shaft further has a second slot defined on a second end thereof so as to retain with a first ring.

3. The mechanical disc brake structure as claimed in claim 1, wherein the connector includes a body, and the body has a first opening axially defined therein and corresponding to the two through orifices of the base, two joining elements, and two contact portions formed on the two joining elements respectively, a fitting post is radially inserted through a second opening of the body intersecting and communicating with the first opening, wherein the fitting post has a third opening configured to accommodate the steel cable, a second ring is defined between the fitting post and the body and has a trough formed around a peripheral wall of the second ring so as to accommodate a second washer.

4. The mechanical disc brake structure as claimed in claim 1, wherein the base includes a stop section connected among the two tops of the two connection racks and the two connecting portions, and the two braking parts of the brake pad have two hooks respectively corresponding to the stop section; one of the two braking parts has a third fixing orifice, and the other braking part has a fourth fixing orifice, such that the third fixing orifice and the fourth fixing orifice are rotatably connected with the shaft of the base, the two hooks of the two braking parts retain with the stop section of the base; a flexible member is defined between the two braking parts and has two extending sheets between which a second connecting portion is formed, each extending sheet has four clamp portions vertically extending from two ends thereof respectively, such that the two clamp portions of each extending sheet are guided into the two braking parts individually; the flexible member further has a projection arranged on two central positions of the two extending sheets and located between the two braking parts so that the two braking parts flexibly clamp or unclamp the disc brake.

5. The mechanical disc brake structure as claimed in claim 1, wherein the second cap has a noncircular driving trench defined in an end thereof.

6. The mechanical disc brake structure as claimed in claim 1, wherein the bearing set of the rotation portion has multiple indentions and multiple third balls accommodated in the indentions individually.

7. The mechanical disc brake structure as claimed in claim 1, wherein the rotation portion has a pushing rib formed around a peripheral wall thereof so as to abut against the resilient element.

* * * * *